United States Patent
Geller et al.

(10) Patent No.: US 10,134,087 B1
(45) Date of Patent: Nov. 20, 2018

(54) PAYMENT CARDS

(75) Inventors: Michal J. Geller, Seattle, WA (US); Gregory M. Hart, Mercer Island, WA (US); Jeffrey P. Bezos, Greater Seattle, WA (US); Michael Carr, Bellevue, WA (US); Brian R. Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1035 days.

(21) Appl. No.: 13/028,986

(22) Filed: Feb. 16, 2011

(51) Int. Cl.
*G06Q 40/00* (2012.01)

(52) U.S. Cl.
CPC .................. *G06Q 40/00* (2013.01)

(58) Field of Classification Search
CPC ...... G06Q 40/00; G06Q 20/10; G06Q 20/102; G06Q 20/40; G06Q 30/00; G06Q 40/02; G06Q 30/04; G06Q 30/06
USPC ...................................... 705/30–45
See application file for complete search history.

(56) References Cited

U.S. PATENT DOCUMENTS

| | | | | |
|---|---|---|---|---|
| 7,099,850 B1 * | 8/2006 | Mann, II | ................ | G06Q 20/16 380/28 |
| 7,103,576 B2 * | 9/2006 | Mann, III | ............... | G06Q 20/04 705/64 |
| 8,126,806 B1 * | 2/2012 | DiMartino | ........... | G06Q 20/105 340/5.7 |
| 8,321,342 B2 * | 11/2012 | Marshall | ................ | G06Q 20/10 705/35 |
| 8,781,960 B2 * | 7/2014 | Marshall | ................ | G06Q 20/10 235/379 |
| 8,793,160 B2 * | 7/2014 | Sorem | ................ | G06Q 30/0255 705/14.53 |
| 2002/0099607 A1 * | 7/2002 | Sosa et al. | ...................... | 705/14 |
| 2005/0242193 A1 * | 11/2005 | Smith | .................... | G07F 7/086 235/487 |
| 2007/0255653 A1 * | 11/2007 | Tumminaro | ........... | G06Q 20/10 705/39 |
| 2007/0255662 A1 * | 11/2007 | Tumminaro | ......... | G06Q 20/027 705/79 |
| 2009/0099964 A1 * | 4/2009 | Calderon Gonzalez | ........ | 705/41 |
| 2009/0119190 A1 * | 5/2009 | Realini | .................. | G06Q 20/04 705/30 |
| 2009/0319352 A1 * | 12/2009 | Boyle | ................ | G06Q 30/0213 705/14.15 |
| 2012/0030103 A1 * | 2/2012 | Hughes | .................. | G06Q 10/00 705/41 |

OTHER PUBLICATIONS

Rigney, Ed., 1998 Advanced Card Technology Sourcebook, Faulkner & Gray 1997, pp. 106-117 and 121-122.*

(Continued)

*Primary Examiner* — Hani M Kazimi
(74) *Attorney, Agent, or Firm* — Lee & Hayes, PLLC

(57) ABSTRACT

Architectures and techniques are configured to distribute and activate payment cards. The techniques include providing payment cards to distributors, who then sell or distribute these cards to other users. Each of these payment cards may include activation information for activating the card as well as redemption information for redeeming a value associated with the card. The distributor may activate a card by, for instance, taking a picture of or scanning an identifier on the card and sending this image to a provider of the card. In response, the provider may activate the card.

43 Claims, 10 Drawing Sheets

(56) References Cited

OTHER PUBLICATIONS

Gemplus and Siemens Introduce Combicard, Gemplus Press Release, May 20, 1997, httD://pluton.aemDlus.fr/ns-search/Dresse/combicard.html, accessed Aug. 25, 1999,2 pages.*

Lamb, Seimens vs. Racom: Two Approaches to Dual-Interface Smart Cards, The Race Between EEPROM and FRAM is On, Report on Smart Cards, Jun. 3, 1996, http://www.racom.com/rsc exd.htm, 7 paaes.*

* cited by examiner

PAYMENT CARDS

BACKGROUND

A large and growing population of people utilize one or more electronic mobile devices (e.g., smartphone, tablet, etc.) in their daily life. As this population continues to grow, more and more people have begun utilizing these mobile devices to conduct transactions remotely, rather than in person. For instance, many people choose to obtain items (e.g., tangible goods, services, etc.) from online entities, rather than by visiting a brick-and-mortar entity to achieve the same end. In addition, with the ever growing popularity of virtual goods and currency, which are purchased for use in online communities or online games, the demand for purchasing goods from online entities is increasing. This newer model of conducting transactions allows people to purchase or otherwise obtain items from nearly any network-accessible location, such as their homes, places of work, public places and the like.

However, while this model offers certain conveniences, certain inconveniences may also exist. For instance, most online entities that offer items for acquisition typically limit their payment options to those that can be accepted and processed electronically. This may include credit cards, debit cards, bank transfers, gift cards, stored value accounts and the like. There is, however, a large community of unbanked people (those that have not obtained, or chose not to obtain, a credit card, debit card, etc.) who cannot participate in purchasing or obtaining items from online entities because the unbanked do not have access to these electronic forms of payment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
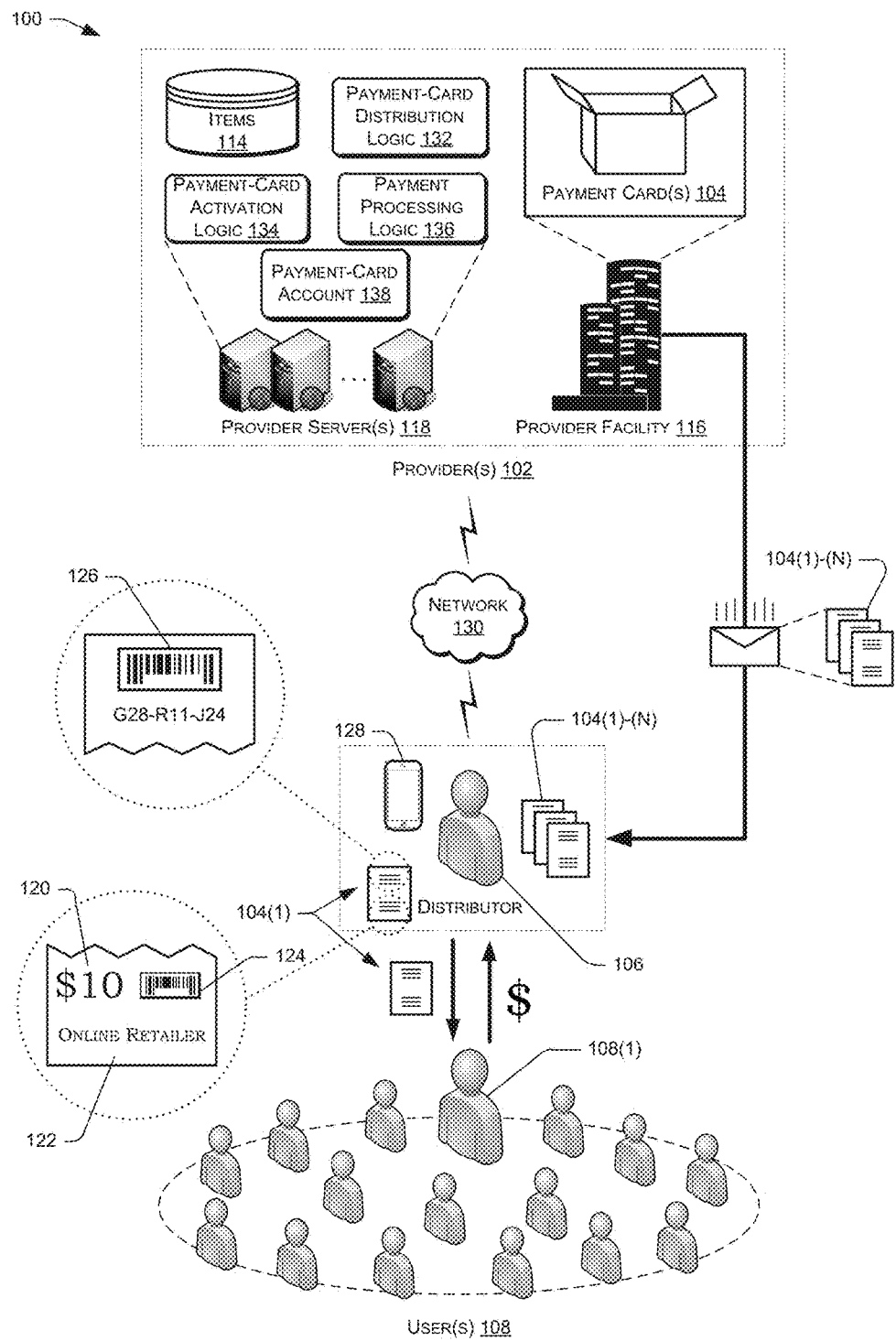
FIG. 1A illustrates an architecture that includes a provider, a distributor and a group of users. Within this architecture, the distributor may obtain payment cards for distribution to the users, where the card includes information for activating the card and information for redeeming the funds associated with the card.

This disclosure describes architectures and techniques for the distribution, activation and operation of payment cards. Each of these payment cards may include activation information for activating the card as well as redemption information for redeeming the value associated with the card. In some instances, the payment card is a multipart card where the activation information is associated with a first portion of the card, and the redemption information is associated with a second detachable portion of the card.

As described below, these techniques include a provider (e.g., an online retailer) distributing batches of payment cards to respective distributors (e.g., students), who then distribute the cards or portions of cards to other users (e.g., their friends). These payment cards may be associated with a certain value that is redeemable at the online retailer or any other entity accepting the card (e.g., can be used to purchase virtual goods for use in an online community or game). By providing a batch of cards to a student, the described techniques allow the student to, in turn, provide these cards to their friends in person, potentially in exchange for cash or another paper-based form of currency. In this scenario, these techniques allow the user's unbanked friends that do not have an electronic form of payment (e.g., credit card, bank card, etc.) access to items offered by an online entity—regardless of whether or not the entity is able to directly accept cash or another paper-based form of currency.

To provide an example, a student (the distributor) may purchase (or otherwise obtain) a batch of fifty payment cards from an online entity (the provider) that offers a social networking game. The online entity may provide tangible cards, electronic cards or a combination thereof. In each case, the cards may or may not be associated with a predetermined value. For instance, each of the cards may be redeemable with the online entity for a value of $10 when activated, while in other instances the value of the card may be defined when the student distributes (e.g., sells) the card to another person (e.g., another student, family member, friend, etc.). In some instances, the batch of cards received by the student may initially be inactive, meaning that any predetermined funds (e.g., $10) associated with the cards might not be yet be redeemable with the online retailer. Upon activation, the recipient of the card provides payment to the student for the card. In exchange, the recipient of the card receives the payment card (or any portion of the card) containing redemption information associated with a value (e.g., $10) that may be used to purchase virtual good for use in the social networking game.

Each of the payment cards received by the distributor may or may not include multiple portions. In one example, the cards are multipart cards that include a top/first portion that the distributor may use to request activation of a respective card, as well as a bottom/second portion that is detachable from the top portion and that may be used to redeem the value of the card after activation. In tangible embodiments, the multipart payment cards may include a perforation for tearing off the bottom portion from the top portion. In electronic embodiments, a distributor may transfer a file associated with the bottom portion to a device or account associated with the purchaser/user of the card.

The distributor may proceed to activate the card in any number of ways. In one example, the payment card includes an identifier (activation information) that uniquely identifies the particular card from other payment cards. In the instance of a multipart card, a top portion of the card may include the identifier. For instance, the card (or a top portion of a multipart card) may include a bar code, a QR code, an activation code, an image with a visible digital watermark or an invisible digital watermark, or any other type of unique identifier. In some embodiments, each card is associated with a unique Global Unique Identifier (GUID) that may be, in some instances, a consecutive sequential number for the batch of payment cards issued to the distributor.

To activate the card, the distributor (or user) may send an activation request to the provider, with the request including the unique identifier. In response, the provider may identify the distributor and activate the particular card. In one example, the distributor may use a device (e.g., a smartphone, a tablet, etc.) to take a picture of the top portion of the card and may send the picture/image to the provider. In other instances, the distributor may use her device to scan a bar code or QR code on the top portion, may send an email or other text-based message that includes the unique identifier to the provider or may send this information to the provider in any other way.

Upon receiving the picture or other communication from the distributor's device, the provider may activate the identified card. In some instances, the distributor maintains an account with the provider that includes an identification of the distributor's device. As such, the provider may be configured to activate cards only upon receiving activation information from the distributor's device, and not from other devices. This prevents fraudulent activation of cards in response to receiving pictures or images of the cards from devices that are not associated with the distributor. In other instances, the distributor may activate payment cards from other devices as well.

After activation, the provider may send a confirmation message to the device of the distributor indicating that the card has been successfully activated. In addition, when initially requesting to activate the card, the distributor may include an identification of the user that has purchased or otherwise obtained the redemption information of the card. For instance, the distributor may include the user's telephone number, email address, physical address, name or any other identifier. With this information, the provider may also send a confirmation (e.g., a receipt) to this user. For instance, the provider may send such a confirmation to a smartphone or other computing device associated with the user.

Once a particular card has been activated, a holder of the redemption information of the card may use the card as a payment instrument at the provider (or other entity). Specifically, the redemption information of the payment card may be a bar code, a QR code, a redemption code or any other unique identifier that the user may use when transacting with the provider. Therefore, a user who generally does not have access to a bank account (or other type of account) for electronically purchasing items (commonly referred to as the "unbanked") may purchase a payment card from a distributor and then use the funds associated with the payment card to conduct electronic transactions. In the instance where the funds associated with the card are redeemable at an online social networking community or for a social networking game, the recipient of the payment card may use the funds to, for example, purchase one or more virtual goods for use in the community or game.

The distributor may provide payment, in whole or in part, for the batch of payment cards. For instance, in the example above, the distributor may purchase the batch of fifty payment cards from the provider. In other instances, the distributor may, meanwhile, provide payment for only a portion of the cards. For instance, in the example above, the distributor may provide payment for a first ten of the fifty cards (i.e., may provide a payment of $100). The provider may then allow the distributor to activate up to ten cards (collectively worth $100) before the distributor provides a further payment to the provider for activating additional cards. In still other instances, the distributor might not provide payment to the provider until after the distribution of at least some of the cards.

In order to incentivize the distributor to distribute the cards as described above, the provider may collect funds from the distributor less than the full value of the cards in some instances. For instance, in this example, the provider may alter the balance of an account of the distributor $450 for the fifty $10 cards. After purchasing the cards, the distributor may then distribute the cards to users in exchange for cash or any other form of currency. Of course, while one example form of incentive has been given, the provider may provide any other form of incentives to distributors. For instance, the provider may offer the distributor discounts, a premier membership with the provider, stored value that may be redeemed at the provider, stored value that may be redeemed with an entity other than the provider, "loyalty" points, virtual currency and the like, as discussed in detail below.

FIG. 1A illustrates an architecture that includes a provider 102 providing one or more payment cards 104(1), . . . , 104(N) to a distributor 106, who in turn may distribute (e.g., sell) the payment cards 104(1)-(N) to any number of users 108. Generally, the cards 104(1)-(N) are associated with a certain value that may be redeemed at the provider 102 or other entities in some embodiments.

In some instances, the provider 102 offers one or more items 114 for acquisition (e.g., purchase, rent, lease, download, stream, etc.), in which case a holder of an activated payment card 104 may use the funds associated with the card to acquire one or more items. An item 114 may include a tangible good (e.g., a book, a laptop, a guitar, etc.), an intangible good (e.g., a digital item, such as an electronic book, song, video, virtual good, virtual currency, game credits, etc.), a service (e.g., tax-preparation services, legal services, etc.), any combination or bundle of tangible item, intangible item and service and/or anything else of extrinsic or intrinsic value. The provider 102 may comprise an online retailer, a brick-and-mortar store, an online social network community, a social network game developer or any other type of online entity from which a user may obtain the item(s).

The payment cards 104 may comprise tangible cards in some instances and digital items in other instances. The architecture 100 illustrates the use of tangible cards, while an architecture 200, described below with reference to FIG. 2, includes cards implemented as digital items.

Within the architecture 100, the distributor 106 may receive the payment cards 104(1)-(N) from the provider 102 in any number of ways. For instance, the provider 102 may deliver (e.g., ship) the cards to the distributor 106 from a facility 116 of the provider 102 or the provider 102 may make the cards available in digital form for the distributor 106 to print out in hard-copy form or download to an electronic device (e.g., smart phone). The distributor 106 may also herself visit the provider's facility 116 to obtain the cards 104(1)-(N) or the like. In addition, in instances where the payment cards 104 comprise digital items, one or more servers 118 associated with the provider 102 may provide the cards to the distributor. Furthermore, and as discussed above, the distributor 106 may provide full or partial payment for the payment cards 104(1)-(N) prior to obtaining the cards, or the provider 102 may collect funds from the distributor 106 at a later date (e.g., after a card's sale to a user).

Regardless of the delivery or initial payment method, FIG. 1A illustrates that the distributor 106 may provide one or more of the payment cards 104(1)-(N) to one or more users of the illustrated user community 108. In the illustrated example, for instance, the distributor 106 provides the payment card 104(1) to the user 108(1) upon activation of the card. As illustrated, the card includes an indication 120 of the predetermined value of the card, as well as an indication 122 of the entity (or entities) that the value may be redeemed with. Here, the card is worth $10 when redeemed at the provider 102, which in this example comprises a merchant having a name "Online Retailer." As such, the user 108(1) may have provided $10 (or another negotiated price) to the distributor 106 in exchange for the card (worth $10 at the provider 102).

While FIG. 1A illustrates an example where the payment card 104(1) has a predetermined value, in other instances the distributor 106 and/or the user 108(1) may set the value of the card at the time of purchase or activation. For instance, the user 108(1) may provide an arbitrary amount of money to the distributor (e.g., $14.96), in which case the distributor 106 may request that the provider set the value of the example card 104(1) as the arbitrary value or an amount based thereon.

In either case, the card may further include an identifier 124 (also referred to as "redemption information") that associates the card 104(1) with the funds or value of the card at the provider 102. This redemption information 124 may comprise any combination of a bar code, a QR code, a redemption code (e.g., a string of alphanumeric characters), a digital watermark or the like. Once the card is activated, the user 108(1) may use the card (and, more precisely, the identifier 124) to conduct a transaction with the provider 102. As will be described in more detail below, in some embodiments, the redemption information associated with a card may also be designated by the recipient of the card at the time of activation (in addition to the value of the card).

In order to activate the card, FIG. 1A illustrates that the card 104(1) may also include an identifier 126 (also referred to as "activation information"). This identifier 126 may comprise any combination of a bar code, a QR code, an activation code (e.g., a string of alphanumeric characters), digital watermark, RFID tag in the card itself or the like. Further, the identifier 126 may be the same or different than the identifier 124 discussed above. In either instance, the distributor 106 may provide the identifier 126 to the provider 102 for the purpose of activating the example card 104(1) in some instances. The activating of the card may result in the funds associated with the card (e.g., the $10 in this example) being made available for use at the provider 102 by the holder of the card (in this example, the user 108(1)).

The distributor 106 may activate the payment card 104(1) in combination with the provider 102 in any number of ways. In some instances, the distributor 106 utilizes a computing device 128 associated with the distributor. For instance, when the distributor 106 desires to activate the card (e.g., after obtaining the funds from the example user, before gifting the card to someone, etc.), the distributor 106 may send an activation request to the provider 102, via the device 128 and over a network 130. This activation request may be accompanied by the identifier 126 of the example card 104(1).

In one example, the device 128 comprises a smartphone that includes a camera and that is associated with the distributor 106 within an account of the distributor at the provider 102. Here, the distributor 106 may capture an image of the card (and, hence, of the identifier 126) and may provide this image to the provider 102 over the network 130. In other instances, meanwhile, the distributor 106 may send, to the provider 102, a simple text message (SMS) that includes the identifier 126, a multimedia message (MMS) that includes the identifier 126, an email that includes the identifier 126 or any other type of communication that somehow requests activation of the particular card 104(1). In certain instances, the distributor 106 may even call the provider 102 or access a web interface of the provider 102 for the purpose of requesting activation of the card 104(1). While FIG. 1A illustrates a smartphone, other embodiments may include cellular telephones, electronic book reader devices, laptop computers, tablets, PDAs, portable media players, entertainment devices, netbooks, gaming consoles, DVD players, desktop computers and the like. Furthermore, it is noted that the network 130 is representative of any one or combination of multiple different types of networks, such as the Internet, cable networks, cellular networks, wireless networks (e.g., Wi-Fi, Rf, cellular) and wired networks.

Although the distributor 106 may activate the example card 104(1) in some instances, in other instances another entity may do so. For instance, the user 108(1) or any other entity may activate the card, or the provider 102 may activate the card upon the user 108(1) redeeming the card.

In response to receiving a valid activation request, the provider 102 may activate the card to allow the user 108(1) to utilize the funds associated with the card. As illustrated, the provider 102 includes the servers 118. These servers 118 may be embodied in any number of ways, including as a single server, a cluster of servers, a server farm or data center and so forth, although other server architectures (e.g., a mainframe architecture) may also be used. Furthermore, each server 118 may include one or more processors and memory, as discussed in detail below with reference to FIG. 7.

In the illustrated example, the servers 118 store or otherwise have access to payment-card distribution logic 132, payment-card activation logic 134, payment processing logic 136 and payment-card account 138, in addition to the items 114 described above. The payment-card distribution logic 132 functions to track/record information regarding distribution of payment cards (regardless of whether the payment card is a multipart card), such as an identity of the distributor 106 and other distributors, which cards these distributors possess, to whom the distributors have distributed the cards to, whether the cards are active or inactive, whether the distributor(s) have paid for the cards, whether the distributors maintain a balance for activating additional cards and the like.

The payment-card activation logic 134, meanwhile, functions to activate payment cards in response to receiving valid requests. In the example used above, for instance, the activation logic 134 may receive an indication that the distributor 106 has requested to activate the card 104(1) by sending a picture/image of the card (including at least the activation information) to the provider 102. In response, the activation logic 134 may identify a sender of the request (e.g., with reference to a phone number of the device 128, an IP address of the device, a name or password attached to the request and the like). In this case, the logic activation 134 may determine that the request was received from a device that is associated with the distributor 106 in an account with the provider. As such, the activation logic 134 may activate the card, thus freeing the funds for use by the user 108(1).

Furthermore, after activation, the activation logic 134 may send a confirmation message to the distributor 106 and/or to the user 108(1). In some instances, the distributor 106 may provide an identification of the user 108(1) (e.g., via a phone number, email address etc.) when requesting to activate the card, thus allowing the activation logic 134 to send a confirmation to both the distributor and the user 108(1). By doing so, the distributor 106 and the user 108(1) may be confident the card is activated while, just before or just after the user 108(1) provides payment for the card. For instance, the user 108(1) may request that the distributor 106 activate the payment card 104(1) and that the provider 102 provide a confirmation message prior to the user 108(1) providing payment for the card to the distributor.

The payment processing logic 136 functions to accept activated cards during transactions between the provider 102 and the users 108. For instance, after the activation described above, the example user 108(1) may obtain (e.g., purchase, rent, lease, stream, download, etc.) items 114 from the provider 102 with use of the example payment card 104(1).

Finally, the payment-card account 138 functions as an account associated with the distributor. As shown in FIG. 1, the payment-card account 138 is stored by the provider servers 138. In other embodiments, the payment-card account 138 may be stored elsewhere and the provider servers 118 have access to the account to alter the balance of the account. Regardless, the payment-card account 138 maintains at least a monetary balance that may be adjusted (e.g., debited and credited) by both the provider 102 and the distributor 106. As will be discussed below in more detail, the distributor 106 may deposit or transfer money into the payment-card account 138 to prepay for inactivated payment cards, use the balance to activate payment cards against and the like. In some embodiments, the payment-card account 138 may also maintain other balances such as, for example, virtual credits, virtual currency or any other non-monetary rewards.

As discussed above, the provider 102 may compensate and incentivize the distributor 106 in many ways. For instance, the provider 102 may sell the payment cards 104(1)-(N) for less than the face value of the cards and, hence, potentially less than the distributor 106 will receive after selling the cards. Additionally or alternatively, the provider 102 may provide credit to the distributor 106 with the provider 102. For instance, if the distributor 106 sells $500 worth of cards, she may earn $50 in credit at the provider 102 (e.g., in the form of a gift card, value in the payment-card account, another stored value account, etc.). In still other instances, the provider 102 may provide non-monetary credit, such as "points" or virtual currency that is redeemable for electronic books, songs, applications or the like. In some instances, these points or virtual currency may be redeemable with other providers (e.g., social networking sites, news sites, virtual worlds, etc.).

Many other similar or different environments are possible. The example environments discussed and illustrated above are merely representative and not limiting. Various other applications, functions and advantages are presented below with respect to the various embodiments. It should be understood that the description and figures provide a number of examples, but the alternatives and variations possible within the scope of the various embodiments are not fully described. These alternatives and variations, however, would be apparent to one of ordinary skill in the art in light of the teachings and suggestions contained herein. It should be understood that reference numbers are carried over between figures to identify similar elements for purposes of simplicity of explanation alone, and this should not be interpreted as limiting the scope of the various embodiments or showing various options as part of the same embodiment.

Figure 1B:
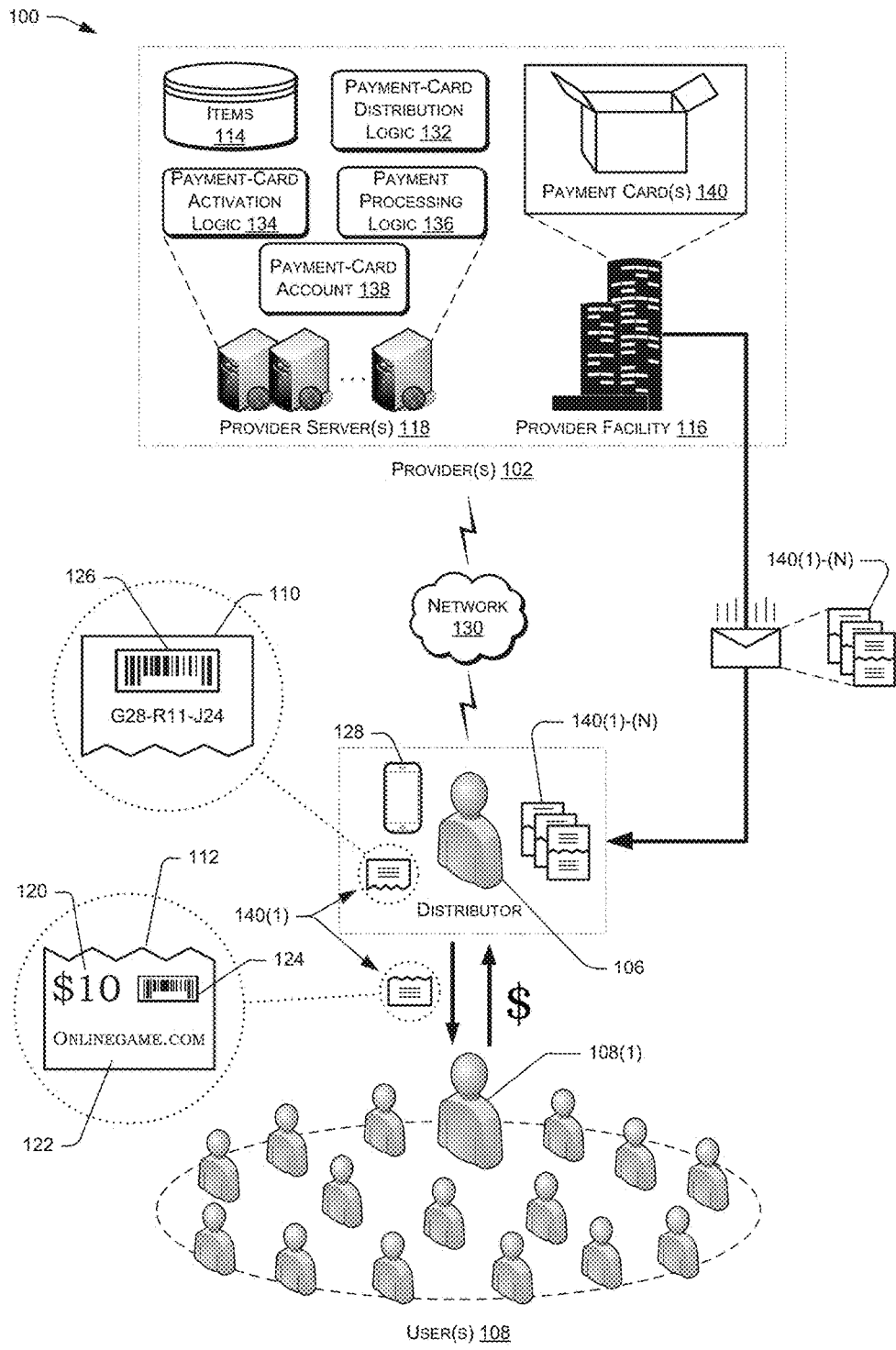
FIG. 1B illustrates an architecture that includes a provider, a distributor and a group of users. Within this architecture, the distributor may obtain multipart payment cards for distribution to the users, where a first portion of the card includes information for activating the card and a second detachable portion allows a user to use funds associated with the card during a transaction with the provider or other entity.

FIG. 1B illustrates an architecture that includes a provider 102 providing one or more multipart payment cards 140(1), . . . , 140(N) to a distributor 106, who in turn may distribute (e.g., sell) the payment cards 140(1)-(N) to any number of users 108. As illustrated, an example multipart payment card 140(1) includes a first portion 110 having activation information 126 for activating the card, as well as a second, detachable portion 112 having redemption information 124 for redeeming the card. That is, the second portion allows a holder/user to use funds associated with the card during a transaction with the provider 102 or other entities in some embodiments. It is noted that while the example multipart payment card 140(1) shown in FIG. 1B includes a top portion 110 of the card for activation and a bottom portion 112 of the card for redemption, these may be reversed in other instances. Furthermore, the example multipart payment card 140(1) may separate into any other number of portions and in any other manner in other embodiments.

The payment cards 140(1)-140(N) may comprise tangible cards in some instances and digital items in other instances. Similar to FIG. 1A, the architecture 100 in FIG. 1B illustrates the use of tangible cards, while an architecture 200, described below with reference to FIG. 2, includes cards implemented as digital items.

Within the architecture 100, the distributor 106 may receive the multipart payment cards 140(1)-(N) from the provider 102 in any number of ways. For instance, the provider 102 may deliver (e.g., ship) the multipart cards to the distributor 106 from a facility 116 of the provider 102, may send the cards in digital form for the distributor 106 to print out in hard-copy form or download to an electronic device (e.g., smart phone), the distributor 106 may herself visit the provider's facility 116 to obtain the multipart cards 140(1)-(N) or the like. In addition, in instances where the cards 140 comprise digital items, one or more servers 118 associated with the provider 102 may provide the cards to the distributor. Furthermore, and as discussed above, the distributor 106 may provide full or partial payment for the cards 140(1)-(N) prior to obtaining the cards 140, or the provider 102 may collect funds from the distributor 106 at a later date (e.g., after a card's sale).

Regardless of the delivery or initial payment method, FIG. 1B illustrates that the distributor 106 may provide one or more of the multipart payment cards 140(1)-(N) to one or more users of the illustrated user community 108. In the illustrated example, for instance, the distributor 106 provides the bottom portion 112 of the multipart payment card 140(1) to the user 108(1) upon activation of the card. As illustrated, the bottom portion 112 of the card includes an indication 120 of the predetermined value of the card, as well as an indication 122 of the provider that is associated with the card. The example bottom portion 112 of the multipart payment card 140(1) is worth $10 when redeemed at the provider 102, which in this example comprises an online entity having a name "Onlinegame.com." As such, the user 108(1) may have provided $10 (or another negotiated price) to the distributor 106 in exchange for the bottom portion 112 of the card (worth $10 at the provider 102).

Figure 2:
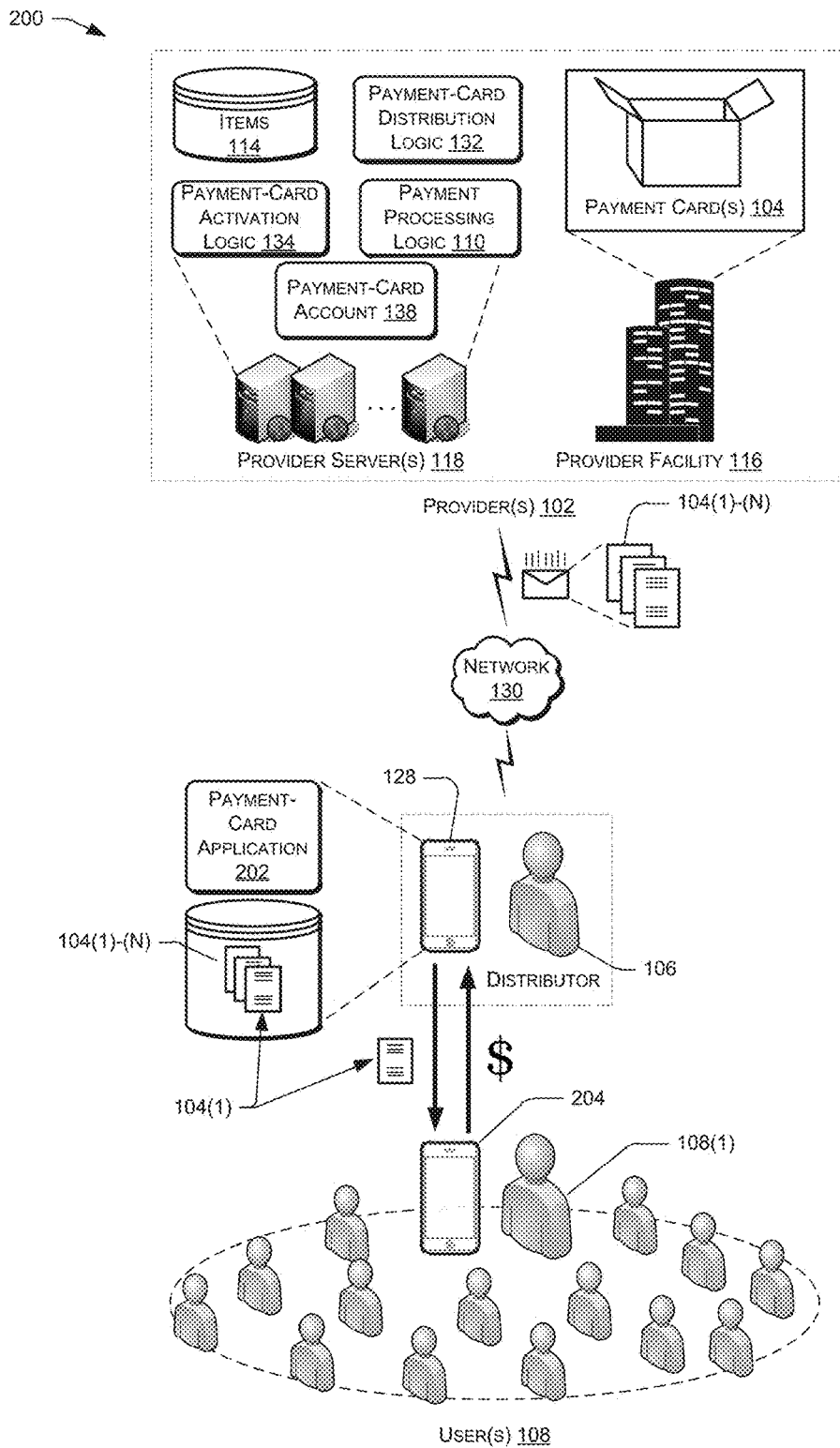
FIG. 2 illustrates another architecture that includes the provider, the distributor and the group of users. In this architecture, the payment cards comprise digital items that may be stored on one or more computing devices.

FIG. 2 illustrates another architecture 200 that may implement the payment cards 104. Within this architecture 200, however, the payment cards 104 comprise digital items that are stored on one or more computing devices. FIG. 2 is described in detail with reference to payment cards 104 for description purposes only, but also applies to the multipart payment cards 140 described above.

As illustrated, the device 128 of the distributor 106 may include a payment-card application 202 that the distributor 106 may have obtained (e.g., downloaded) from the provider 102. This application 202 may allow the distributor 106 to obtain (e.g., purchase) the payment cards 104, activate the payment cards 104, distribute the payment cards 104, transact with the payment cards 104 and/or the like. As illustrated, the provider 102 may provide the electronic or digital payment cards 104(1) to the device 128 of the distributor 106. While FIG. 2 illustrates that the device 128 stores the cards locally, in other instances, the provider 102 stores the cards (i.e., stores the activation and redemption information associated with the cards), in which case the distributor 106 may access the cards via the payment-card application 202.

In either case, within the architecture 200, the distributor 106 may distribute the electronic payment cards 104 to the users 108. FIG. 2, for instance, illustrates that the example user 108(1) is associated with an electronic device 204. In some instances, the user 108(1) may provide a payment to the distributor 106 who, in turn, provides the example card 104(1) to the electronic device 204 of the user 108(1) with use of the application 202. In the instance where the distributor retains the activation information, the distributor 106 electronically transfers or passes the redemption information associated with the payment card 104 to the electronic device 204 of the user 108. Although not shown in FIG. 2, the electronic device 204 of the user 108(1) may also have obtained a payment-card application 202 for storing payment cards (in particular, the redemption information) for use with a provider associated with the payment card.

The transfer of the redemption information may comprise sending a portion of a data file that represents the redemption information associated with the payment card 104(1) to the device 204 of the user 108(1). That is, the payment-card application 202 may send the redemption information stored on the device 128 of the distributor 106 to the device 204 of the user 108(1), while deleting some or all of the activation and/or redemption information from the device 128 of the distributor 106. In the scenario whereby the user device 204 includes a payment card application 202, the redemption information transmitted by the electronic device 128 may be stored locally on the electronic device 204 and made available for redemption via the payment card application 202. In other embodiments, the redemption information transmitted by the electronic device 128 may be stored remotely (e.g., stored in the cloud) and made available for redemption via the payment card application 202.

In some instances, the digital cards are renderable on displays of the respective devices 128 and 204 (e.g., with use of the payment-card application 202). As such, prior to the distributor sending the activation information of the card 104(1) to the device 204, the display of the distributor's device 128 may render a user interface that displays an image of the payment card 104(1) (i.e., a fully-intact card). In the instances where the card is a multipart payment card, prior to the distributor sending the bottom portion 112 of the card 140(1) to the device 204 of the user 108(1), the display of the distributor's device 128 may render a user interface that includes both the top and bottom portions of the card (i.e., a fully-intact card). However, upon sending the bottom portion of the card to the device 204, the interface displayed on the device 128 may no longer display the bottom portion. Instead, the display of the device 128 may simply display the top portion of the card. After receiving the bottom portion 112 of the card, meanwhile, the display of the device 204 may in fact render a user interface that illustrates the bottom portion of the card. In some instances, the bottom portion of the card may include the identifier 124 of the card, described above with reference to FIG. 1B, when rendered on the device 204. As such, the user 108(1) may be able to redeem the payment card in the same manner as with a physical card.

The distributor 106 may distribute a payment card 104(1) (or a bottom portion 112 of a payment card 140) to the device 204 of the user 108(1) in any number of ways. In the instance of transferring payment cards 104 to a user 108(1), the distributor 106 may attach the data file representing the payment card 104 to an email or any other type of digital communication before sending the communication to the user 108(1). Conversely, the distributor 106 may transfer the card or the balance associated with the card to an account of the user 108(1) at the provider 102 (e.g., via a web interface of the provider). In another example, the payment-card application 202 stored on the distributor's electronic device 128 transfers the payment card (at least the redemption information) to the user's device 204 via an infrared, near-field communication, RFID or another local communication. As discussed above, in one embodiment, the user may then access the payment card via a payment card application 202 stored on the user's device 204.

In the scenario where the distributor transfers a multipart payment card 140 to a user 108(1), the distributor 106 may attach the data file representing the bottom portion of the card to an email or any other type of digital communication before sending the communication to the user 108(1). Conversely, the distributor 106 may transfer the bottom portion of the card or the balance associated with the bottom portion of the card to an account of the user 108(1) at the provider 102 (e.g., via a web interface of the provider). In another example, the payment-card application 202 may allow the distributor 106 to transfer the bottom portion 112 of the card to the device 204 via an infrared or another local communication.

Figure 6:
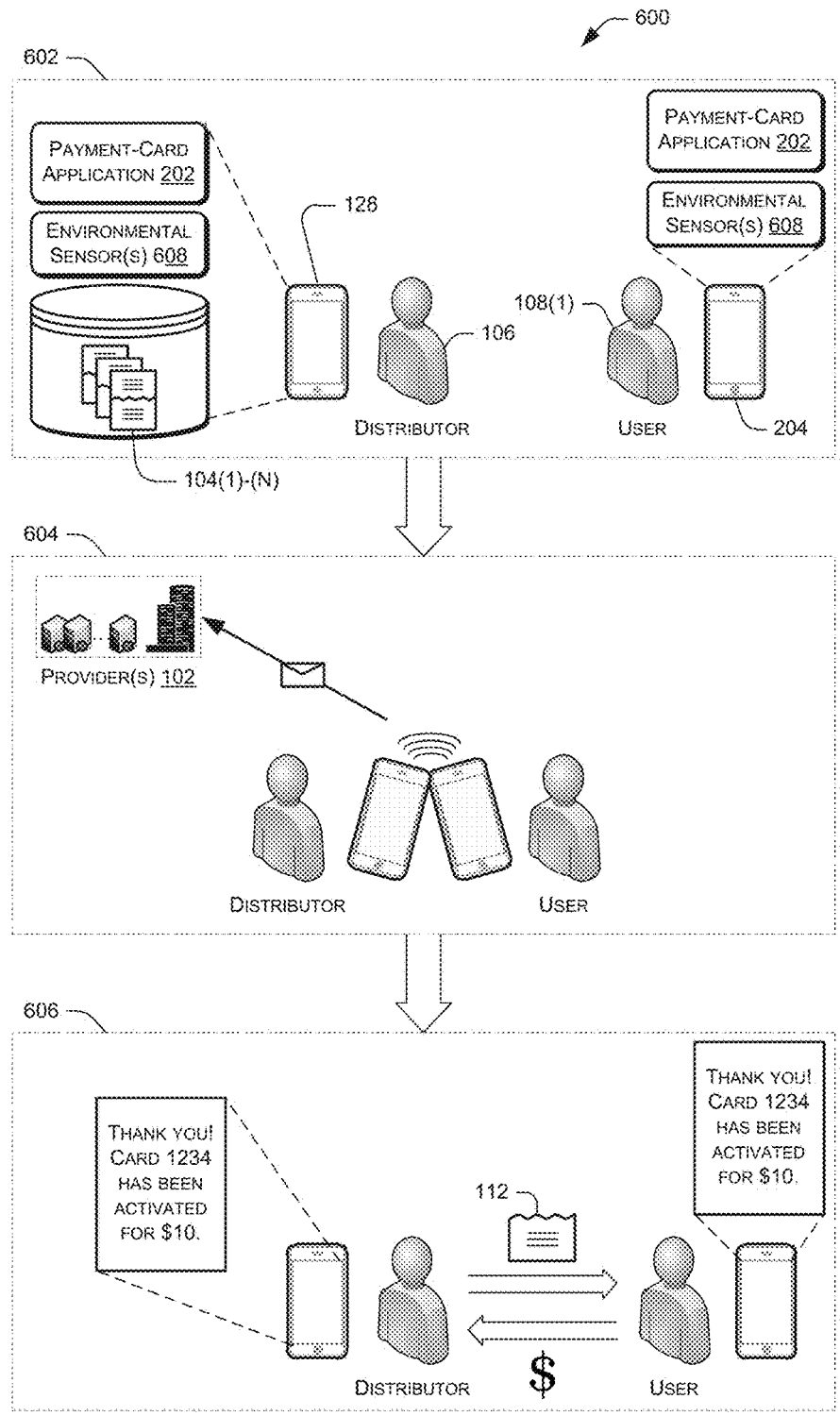
FIG. 6 depicts one possible scenario for a distributor providing a portion of an electronic multipart payment card to a user.

In yet another example, the payment-card application 202 may include logic that allows the distributor 106 and the user 108(1) to simply "bump" their respective devices together, resulting in the transfer of the bottom portion 112 from the device 128 and to the user device 204, as known to those skilled in the art. Furthermore, this bump may also trigger a payment from an account of the user 108(1) to an account of the distributor 106. FIG. 6 describes this embodiment in greater detail. In yet another example, the payment card application 202 may include logic that allows the distributor to transfer the redemption information to the user based on obtaining (e.g., taking a picture of) a bar code or QR code that is unique to the user 108 and generated and/or displayed by the user's electronic device 204.

Figure 3A:
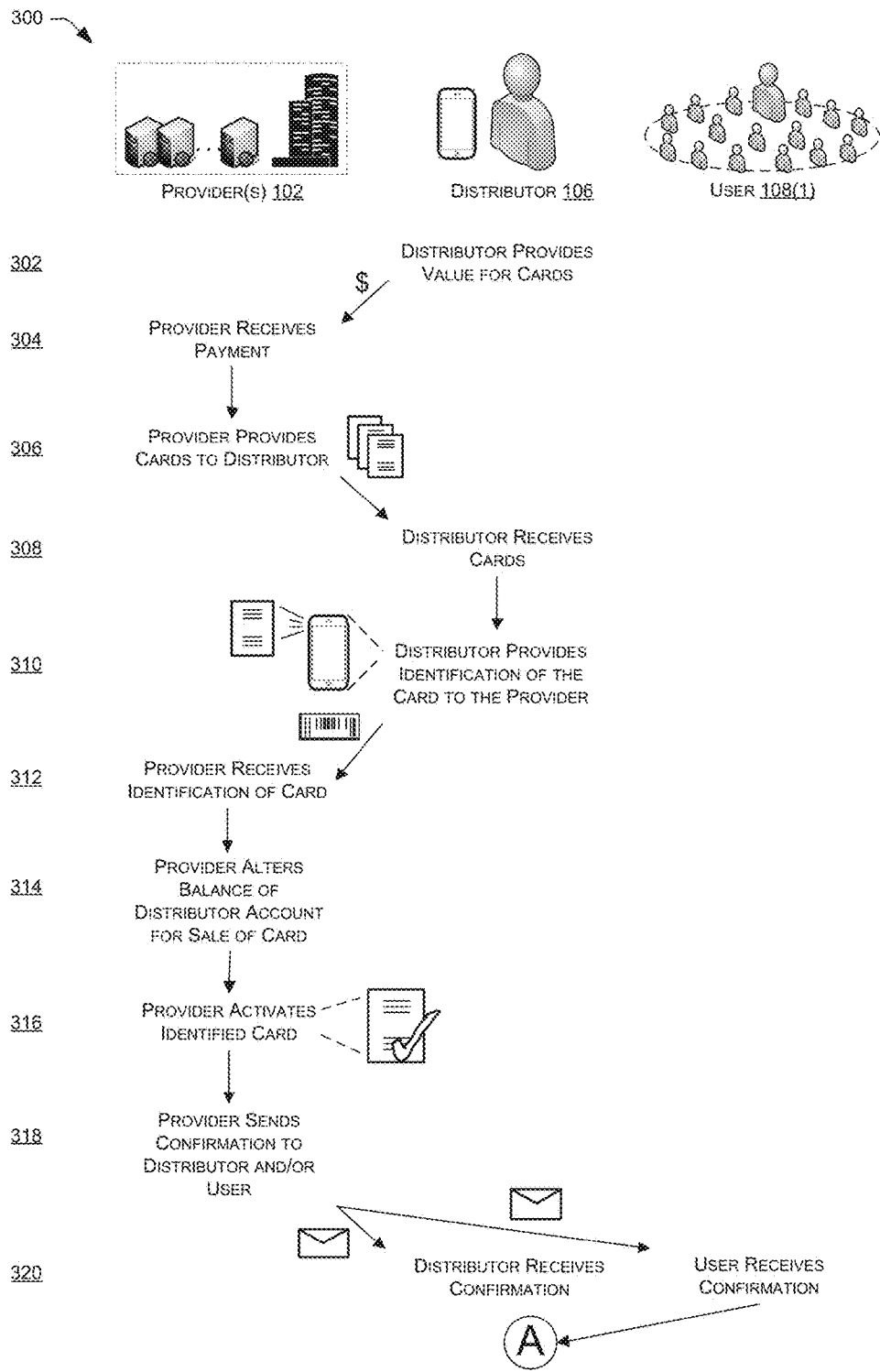
FIGS. 3A-3B depict one possible scenario for distributing and activating payment cards.
Figure 3B:
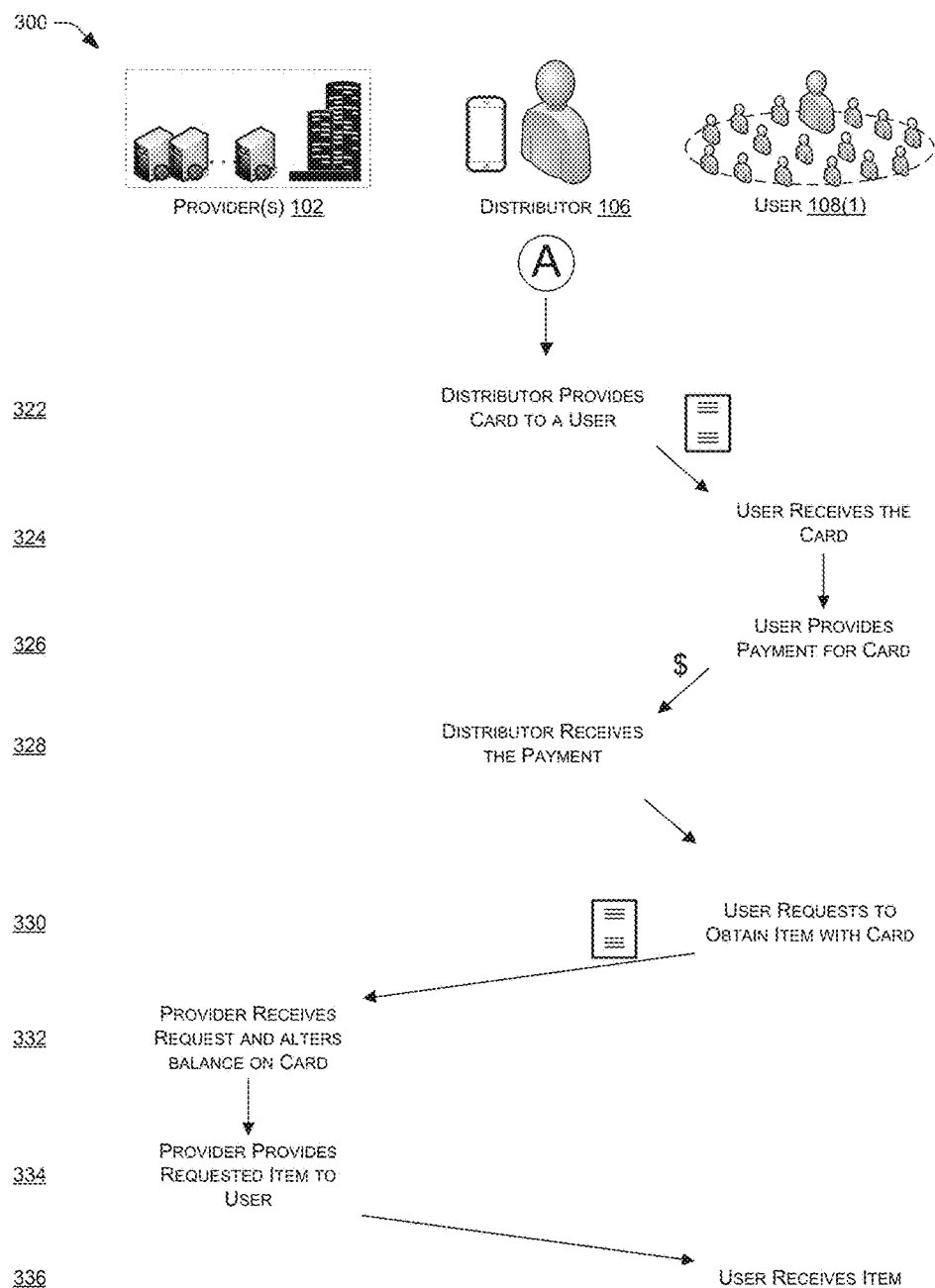

FIGS. 3A-3B depict one possible process 300 for distributing and activating the payment cards 104 described above. The process 300 (as well as each process described herein) is illustrated as a collection of operations in a logical flow graph, which represent a sequence of operations, some or all of which can be implemented in hardware, software or a combination thereof. In the context of software, the blocks represent computer-executable instructions stored on one or more computer-readable storage media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the processes illustrated herein are described with reference to the architecture 100 of FIGS. 1A-1B and the architecture 200 of FIG. 2, although these processes may be implemented in a wide variety of other architectures.

At 302, the distributor 106 may request to obtain one or more payment cards and provide value for these cards. For instance, the distributor 106 may provide a full or partial payment for a batch of inactive payment cards. In response to receiving a request for payment, the provider 102 may alter the balance of payment-card account 138 accordingly. In other instances, meanwhile, the balance of the distributor's payment-card account 138 may not be altered for the cards until the time of activation. At 304, the provider 102 receives the payment in this example. In response, the provider 102 provides one or more physical or electronic payment cards 104 to the distributor 106 at 306.

At 308, the distributor 106 or the device 128 of the distributor 106 receives the cards. In some embodiments, the payment cards received by the distributor 106 have a predetermined value (e.g., $10). In other embodiments, as discussed above, all, or a portion, of the cards received from the provider 102 may not be associated with a predetermined value. In this instance, the value of the card may be designated or set at time of activation. In the instance where the provider electronically delivers the payment cards to the distributor (at 306), the payments cards may be stored locally on the electronic device 128, in the distributor's payment-card account 138 or any other account associated with the distributor, which is accessible via the payment card application 202 located on the distributor's electronic device 128.

At 310, the distributor 106 requests to activate the payment card by providing the identifier ("activation information") from the card, which is still in the distributor's possession. As discussed above, the user may, in some instances, take a picture of the card and send the picture to the provider 102 for verification and activation. Additionally or alternatively, the distributor 106 may scan the activation information and send this information to the provider 102, may send an email, SMS or MMS message that includes the identifier to the provider, may call the provider over the telephone or may activate the card in any other way.

In the instance whereby the user 108(1) may designate the redemption information associated with the activated payment card 104 (instead of using predetermined activation information associated with the card), the distributor 106 may also provide the redemption code or information designated by the user 108(1) along with the activation information. This user selected redemption information may include any string of text, characters, images and the like. By way of example only, the user 108(1) may designate that the activation include, among other things, the user's first name, a pet's name, an image stored in their device 204 and so on.

In the instance where the user 108(1) may designate the value associated with the activated card (or redemption information), the distributor 106 may also provide the value designated by the user 108(1) along with the activation information. Using the example provided above, the user 108(1) may designate the value of the activated card to be $14.96. Thus, the distributor 106 may also provide the dollar value of $14.96 along with the activation information (and possibly the "customized" redemption information).

Furthermore, as a part of, or separate from, the request to activate the card, the distributor 106 may send an identification of the user 108(1) to the provider 102. Doing so may allow the provider 102 the ability to send a confirmation to the user 108(1) upon activation, as discussed below. By way of example only, the user 108(1) may be identified by an email address, a mobile phone number or by displaying a bar code or QR code on her device 204 that is unique to the user 108(1) and the like. In addition or in the alternative, the distributor 106 may specify a value for association with the card in instances where the card value is not predetermined. That is, if the user 108(1) provided the distributor 106 with a certain amount of money, the distributor 106 may request that the card be activated for that amount (or some other amount, as negotiated between the user 108(1) and the distributor 106). At 312, the provider 102 receives the request to activate the card in the form of the identification of the card.

At 314, the provider 102 identifies the card from the received identifier and identifies the distributor that was associated with that card (e.g., with reference to an identifier of the device 128 that sent the communication). In some instances, the provider 102 may collect funds from the distributor 106 at this time. For instance, if the distributor provided no payment or only a partial payment prior to receiving the cards (at 302), then the provider 102 may collect payment from the distributor 106 at this time. Further, in instances, where the distributor 106 specifies the value of the card at 316, the provider 102 may alter the balance of an account of the distributor 106 for that amount (or any portion of that amount). Regardless, using the payment-card account 138 example shown in FIGS. 1-2, the provider 102 may alter or adjust the balance of the payment-card account 138 associated with the distributor 106.

In the example where the distributor provided payment for a first ten of the fifty cards (i.e., may provide a payment of $100), the provider determines, at time of activation, whether the payment-card account 138 of the distributor has sufficient funds to activate the payment card (e.g., $10 in the instance where the distributor is selling a single $10 card). If the payment-card account 138 account has sufficient funds, the provider alters the balance of the account accordingly. As discussed above, the account balance may be altered by the amount of the card or by any amount less than the card. The distributor may continue to activate and sell these cards as long as the distributor's payment-card account 138 has a sufficient balance. For example, if the provider alters the balance of the distributor's payment card account 138 for the face value of the card and the distributor has a $100 balance in her account, the provider may allow the distributor to activate up to ten $10 cards (collectively worth $100) before the distributor provides a further payment to the provider for activating additional cards.

At 316, the provider activates the identified card. At this point, the holder of the card (here, the user 108(1)) may use the payment card 104 (and/or the redemption information thereon) to conduct a transaction with one or more providers 102 and/or with one or more other merchants that sponsor or accept the payment card. At 318, the provider 102 sends a confirmation to the distributor 106 and/or the user 108(1) indicating that the card has been activated. This confirmation may comprise an email, an SMS or MMS message, an automated phone call, a message left at user accounts of the distributor 106 and the user 108(1) at the provider 102, a message delivered to the payment card application 202 stored on the distributor's electronic device 128 and/or the user's electronic device 204 or the like. At 320, the distributor 106 and the user 108(1) receive the confirmation.

In some instance, the distributor receives points, virtual currency and the like, from the provider (or any other entity) upon activation of a payment card. In addition, in some instances, the activation of the payment card may be publicly or privately announced within one or more social networking services (e.g., activation is posted on distributor's social networking wall), microblogging services (e.g., activation is posted to a microblogging service), geolocation services (e.g., location of activation is made publicly available) and so on.

FIG. 3B continues the illustration of the process 300. At 322, the distributor 106 provides the activated card to the user, such as the example user 108(1). As discussed above, this card may allow the user to use the funds associated with the payment card. In embodiments where the card is a tangible item, the distributor 106 may physically hand or mail this portion to the user 108(1). In embodiments where the card is a digital item, the distributor may provide a portion of a data file representing the card to a device of the user 108(1).

At 324, the user 108(1) or the device 204 of the user 108(1) receives the activated card and, at 326, the user 108(1) provides payment to the distributor 106. In some instances, the user 108(1) may provide this payment prior to receiving the card or may not provide payment at all (e.g., in the case of a gift). At 328, the distributor 106 receives the payment from the user 108(1).

At this point, the user 108(1) may realize that the stored value associated with the payment card 104(1) is available for use. As such, at 330, the user 108(1) requests to obtain an item from the provider 102 with use of the card. For instance, the user 108(1) may navigate to a retail site hosted by the provider 102 in order to request to obtain (e.g., purchase, rent, etc.) an item. The user 108(1) may pay for this item with the funds associated with the payment card by providing the identifier 124 (redemption information) on the card in the user's possession. As another example, the user 108(1) may navigate to a social networking site that accepts the payment card in order to purchase virtual goods, virtual currency, game credits, etc. for use in an online game offered by the social networking site.

At 332, the provider 102 receives the request and reduces the remaining balance on charges the card. That is, the provider 102 deducts the total cost of the transaction from the value of the funds associated with the card. If additional payment is needed because the associated funds did not cover the total cost of the item, then the provider 102 may request that the user 108(1) provide an additional form of payment. At 334, the provider 102 (or another entity) provides the requested item to the user 108(1). As discussed above, the item may comprise any sort of tangible or intangible good, service or product. At 336, the user 108(1) receives the item.

Figure 4A:
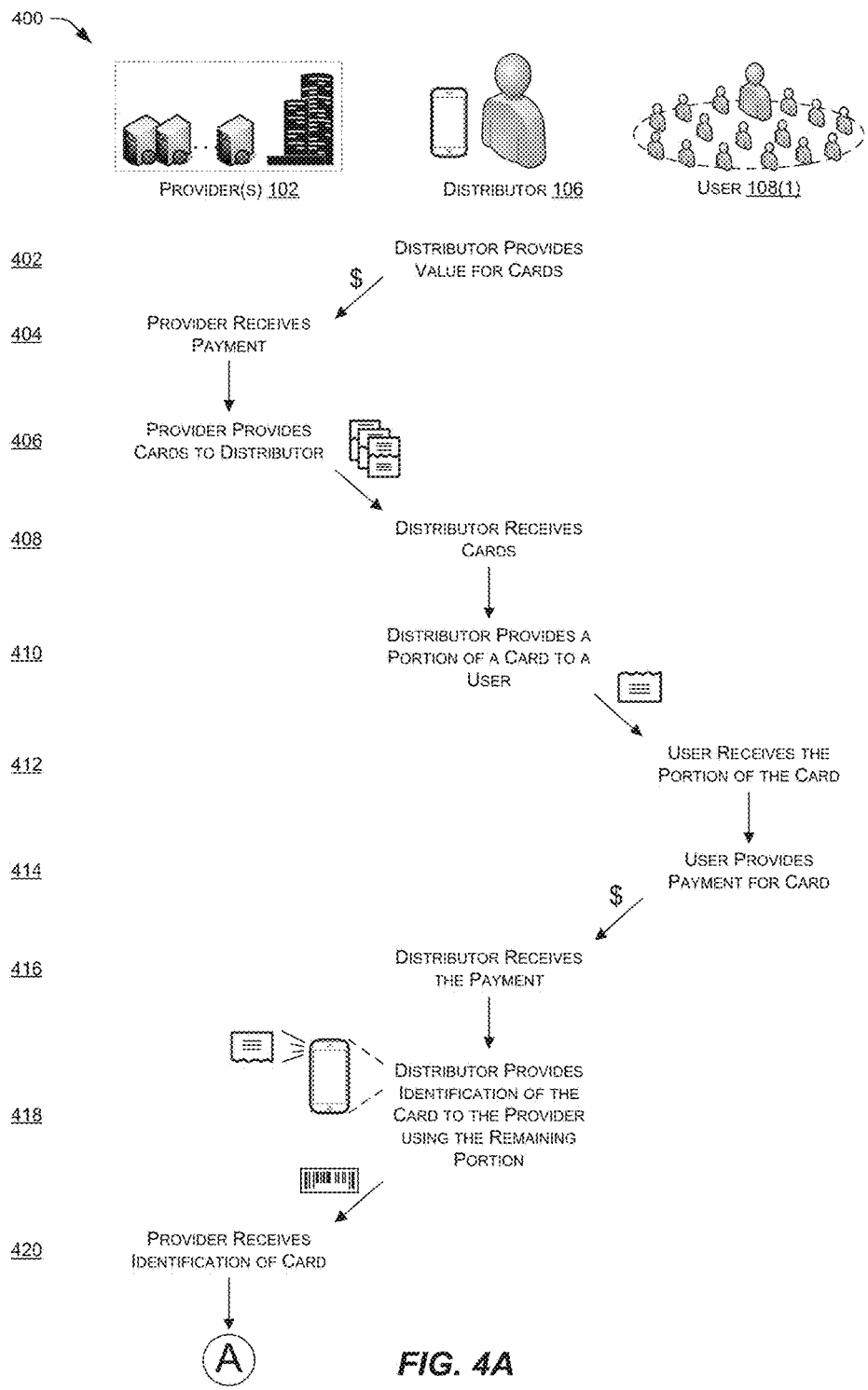
FIGS. 4A-4B depict one possible scenario for distributing and activating multipart payment cards.
Figure 4B:
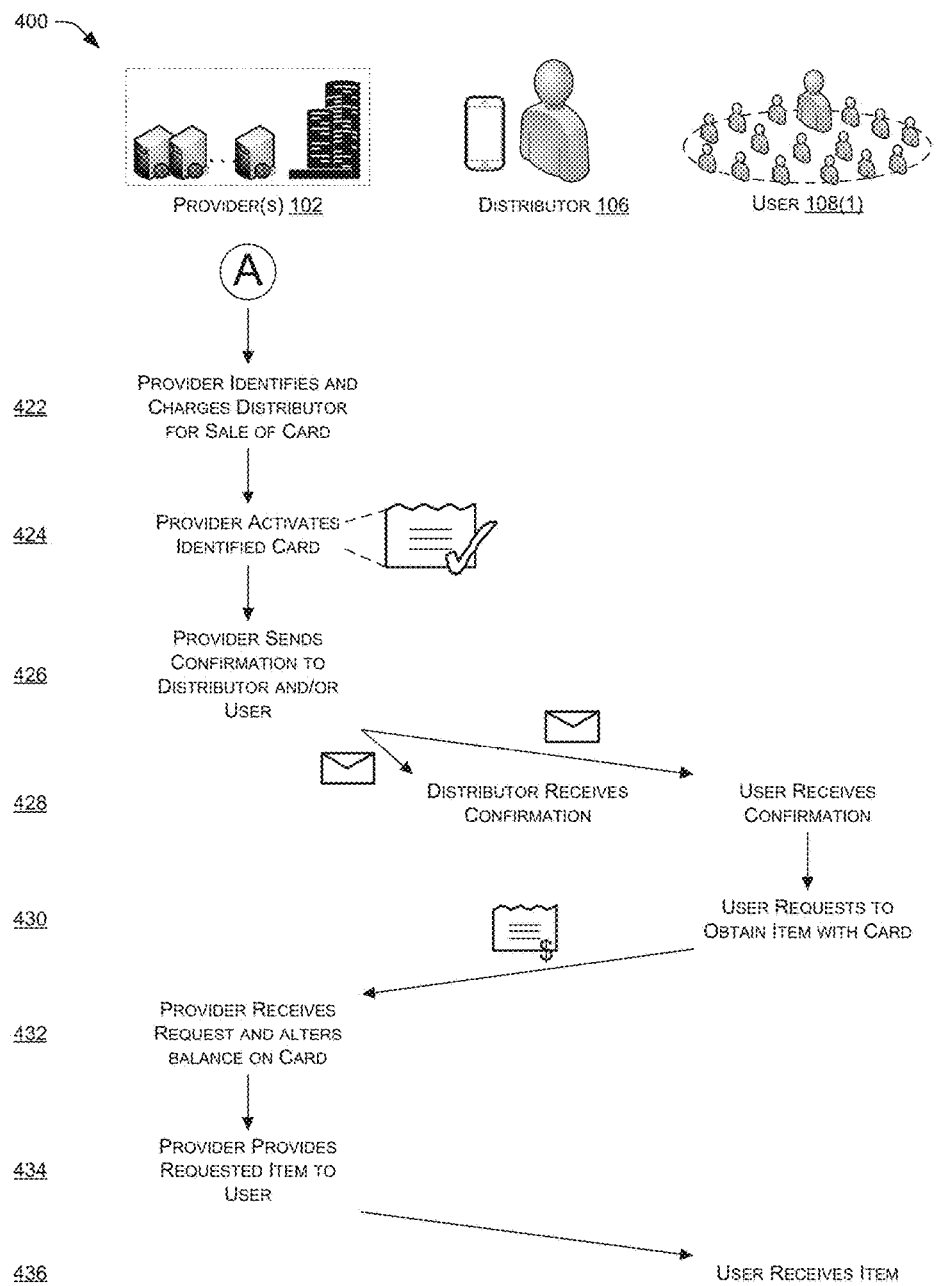

FIGS. 4A-4B depict one possible process 400 for distributing and activating the multipart payment cards 104 described above. The process 400 (as well as each process described herein) is illustrated as a collection of operations in a logical flow graph, which represent a sequence of operations, some or all of which can be implemented in hardware, software or a combination thereof. In the context of software, the blocks represent computer-executable instructions stored on one or more computer-readable storage media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the processes illustrated herein are described with reference to the architecture 100 of FIGS. 1A-1B and the architecture 200 of FIG. 2, although these processes may be implemented in a wide variety of other architectures.

At 402, the distributor 106 may request to obtain one or more multipart payment cards and provide value for these cards. Similar to FIG. 3, the distributor 106 may provide a full or partial payment for a batch of inactive multipart payment cards. In other instances, meanwhile, the distributor 106 may be charged for the cards upon activation. At 404, the provider 102 receives the payment in this example by, for example, adjusting the balance in the payment-card account 138 or any other account associated with the distributor. In response, the provider 102 provides one or more physical or electronic multipart payment cards to the distributor 106 at 406. As discussed above, the cards provided by the provider 102 may be associated with a predetermined value, may not be associated with a predetermined value (e.g., value designated at time of activation) or any combination thereof. At 408, the distributor 106 or the device 128 of the distributor 106 receives the cards.

At 410, the distributor 106 provides a portion of a card to a user, such as the example user 108(1). As discussed above, this portion of the card may allow the user to use the funds associated with the payment card upon activation of the card. In embodiments where the card is a tangible item, the distributor 106 may detach the portion of the card from the originally-intact card and physically hand or mail this portion to the user 108(1). In embodiments where the card is a digital item, the distributor may provide a portion of a data file representing the card to a device of the user 108(1). As discussed above, the data file may be delivered to the user 108(1) via email, SMS, IM, near field communication, infra-red communication, holding the device within proximity of each other and the like. In addition, or in the alternative, the data file may be stored locally on the user's device 204 on the payment-card application 202.

At 412, the user 108(1) or the device 204 of the user 108(1) receives the portion of the card and, at 414, the user 108(1) provides payment to the distributor 106. In some instances, the user 108(1) may provide this payment prior to receiving the portion of the card or may not provide payment at all (e.g., in the case of a gift). At 416, the distributor 106 receives the payment from the user 108(1).

At 418, the distributor 106 requests to activate the payment card by providing the activation information from the portion of the card still in the distributor's possession. As discussed above, the user may, in some instances, take a picture of the remaining portion of the card and send the picture to the provider 102 for verification and activation. Additionally or alternatively, the distributor 106 may scan and send an identifier of the remaining portion to the provider 102, may send an email, SMS or MMS message that includes the identifier to the provider, may call the provider over the telephone or may activate the card in any other way. As discussed above, the distributor may also provide, in addition to the activation information, a value of the card and/or redemption information designated by the user 108(1).

Furthermore, as a part of or separate from the request to activate the card, the distributor 106 may send an identification of the user 108(1) to the provider 102. Doing so may allow the provider 102 the ability to send a confirmation to the user 108(1) upon activation, as discussed below. In addition, or in the alternative, the distributor 106 may specify a value for association with the card in instances where the card value is not predetermined. That is, if the user 108(1) provided the distributor 106 with a certain amount of money, the distributor 106 may request that the card be activated for that amount (or some other amount, as negotiated between the user 108(1) and the distributor 106). At 420, the provider 102 receives the request to activate the card in the form of the identification of the card.

FIG. 4B continues the illustration of the process 400. At 422, the provider 102 identifies the card from the received identifier (from the top portion 110) and identifies the distributor that was associated with that card (e.g., with reference to an identifier of the device 128 that sent the communication). In some instances, the provider 102 may collect the value of the card from the distributor 106 at this time. For instance, if the distributor provided no payment or only a partial payment prior to receiving the cards, then the provider 102 may collect the appropriate amount from the distributor 106 at this time by altering a balance of an account of the distributor. Further, in instances, where the distributor 106 specifies the value of the card at 418, the provider 102 may alter the balance of an account of the distributor 106 for that amount.

At 424, the provider activates the identified card. At this point, the holder of the bottom portion of the card (here, the user 108(1)) may use the bottom portion of the card (and/or the redemption information thereon) to conduct a transaction with the provider 102 and/or with one or more other merchants that sponsor the payment card. At 426, the provider 102 sends a confirmation to the distributor 106 and/or the user 108(1) indicating that the card has been activated. This confirmation may comprise an email, an SMS or MMS message, an automated phone call, a message left at user accounts of the distributor 106 and the user 108(1) at the provider 102 or the like. At 428, the distributor 106 and the user 108(1) receive the confirmation.

At this point, the user 108(1) may realize that the stored value associated with the multipart payment card 104(1) is available for use. As such, at 430, the user 108(1) requests to obtain an item from the provider 102 with use of the card. For instance, the user 108(1) may navigate to a retail site hosted by the provider 102 in order to request to obtain (e.g., purchase, rent, etc.) an item. The user 108(1) may pay for this item with the funds associated with the payment card by providing the identifier 124 on the portion of the card in the user's possession.

At 432, the provider 102 receives the request and alters the balance of the card. That is, the provider 102 deducts the total cost of the transaction from the value of the funds associated with the card. If additional payment is needed because the associated funds did not cover the total cost of the item, then the provider 102 may request that the user 108(1) provide an additional form of payment. At 434, the provider 102 (or another entity) sends the requested item to the user 108(1). As discussed above, the item may comprise any sort of tangible or intangible good, service or product. At 436, the user 108(1) receives the item.

Figure 5:
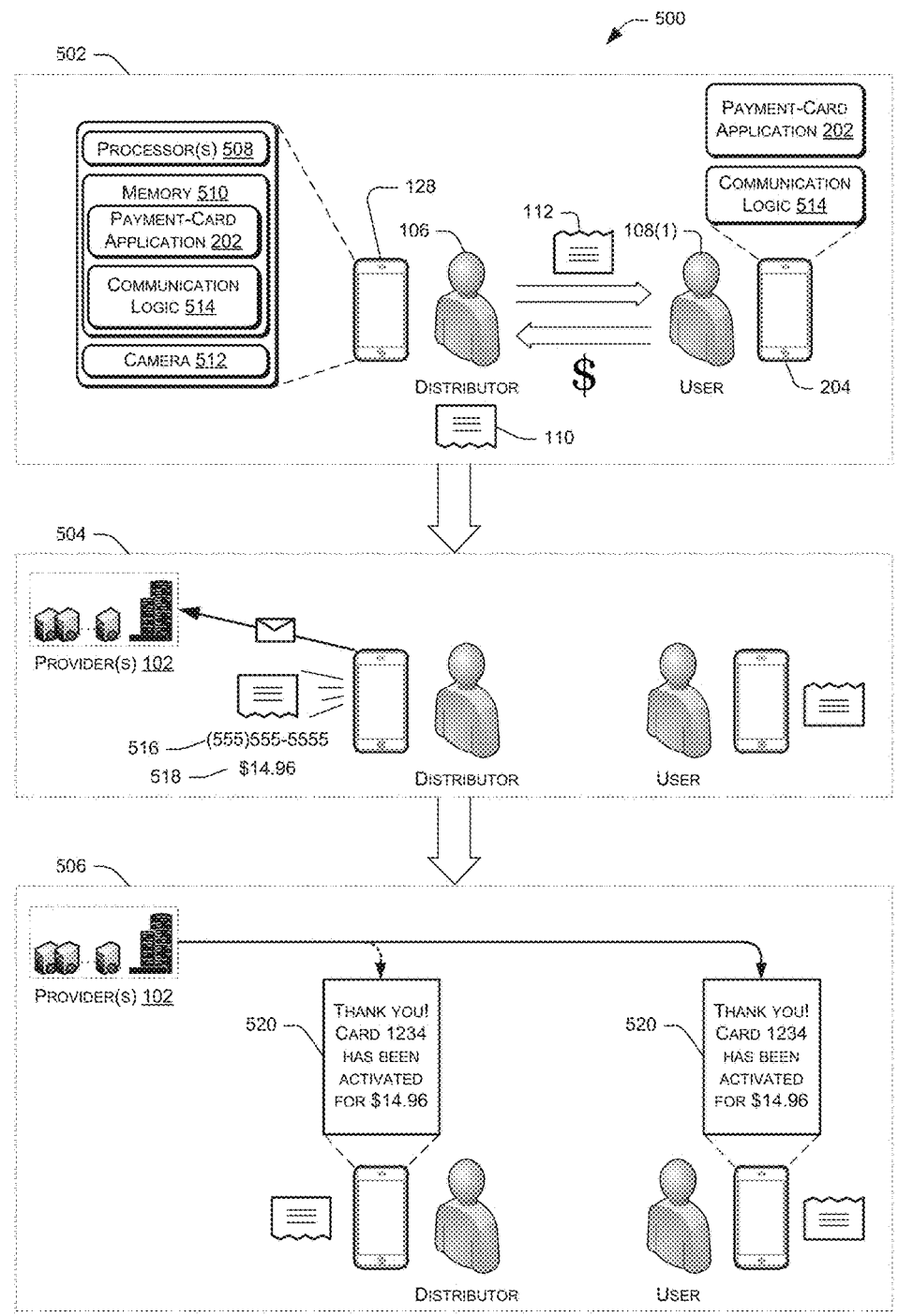
FIG. 5 depicts one possible scenario for a distributor providing a portion of a tangible multipart payment card to a user and activating the distributed card.

FIG. 5 depicts an example process 500 that includes the distributor 106 providing a portion of a tangible multipart payment card to a user at 502, the distributor requesting to activate the distributed card at 504 and the provider 102 providing a confirmation of the activation at 506. FIG. 5 is described with reference to a multipart payment card for illustration purposes only and equally applies with reference to a one-piece payment card. In this case, the distributor may provide the entire payment card to the example user 108(1).

In more detail, the distributor 106 provides the bottom portion 112 of an inactivated card to the example user 108(1) in exchange for a payment at 502, while retaining the top portion 110. At 504, meanwhile, the distributor 106 utilizes her device 128 to send a request to activate the card to the provider.

To send such a request, the device 128 may include some or all of the components shown at 502. For instance, the device 128 may include one or more processors 508, memory 510 and a camera 512. The memory 510 may store the payment-card application 202 described above, as well as communication logic 514. The communication logic 514 may include email, SMS, MMS or any other type of communication functionality. The user's device 204, although not shown in FIG. 5, may include all the components and elements shown included on device 128.

Returning to 504, the distributor 106 may capture an image of the top portion 110 of the card (at least including the activation information) using the camera 512 of the device 128. In this example, the distributor 106 may also input an identifier 516 (e.g., a phone number, email address, etc.) and an amount 518 of funds to associate with the multipart payment card. After inputting this information, into the application 202 or otherwise, the distributor 106 may send this information to the provider 102 using the communication logic 514 of the device 128. In response, the provider 102 may activate the card for the requested amount and collect the appropriate amount of funds from the distributor 106.

In addition, at 506, the provider 102 may send a confirmation message 520 to one or both of the distributor 106 and the user 108(1). As shown above at 502, the device 204 of the user 108(1) may also include the payment-card application 202, and, therefore, both devices may provide a confirmation message via the application 202. In some instances (as illustrated), the devices may receive a similar confirmation, while in other instances the respective confirmation messages may be tailored to the distributor 106 and the user 108(1) that purchased the card. In some instances, the application 202 may be a trusted application that is associated with and branded by the provider 102. In other instances, meanwhile, the confirmation messages 520 may be received by the user 108(1) and/or the distributor 106 via email, SMS, MMS or any other type of communication.

FIG. 6 depicts another example process 600 that includes the distributor 106 providing a portion of an electronic multipart payment card to the user 108(1). In this example, the distributor 106 and the user 108(1) electronically exchange the bottom portion of the card for a payment by associating their devices together with one another. FIG. 6 is described with reference to a multipart payment card for illustration purposes only and equally applies with reference to a one-piece payment card. In the case of a one-piece payment card, the distributor may provide the entire payment card to the example user 108(1).

At 602, the distributor 106 and the user 108(1) may decide to enter into a transaction with one another, where the distributor 106 provides the bottom portion 112 of an electronic payment card to the user 108(1) in exchange for a payment. As illustrated at 602, the device 128 of the distributor may store one or more payment cards 104(1)-(N), as well as the payment-card application 202. In addition, the device 128 may include one or more environmental sensors 608. The device 204 of the user 108(1) may similarly store the payment-card application 202 and may also include one or more of the same or different environmental sensors 608. The environmental sensors 608 may include global positioning system (GPS) technology, a gyroscope, a vibration sensor, a barometer, a camera, an altitude sensor, a thermometer and/or any other sensor capable of detecting information pertinent to a device's environment and/or an event experienced by the device.

At 604, meanwhile, the distributor 106 and the user 108(1) may place their devices within close proximity of one another or physically touch or "bump" their devices together. In response, as known to those skilled in the art, the applications 202 stored on the devices may send information from the respective environmental sensors 608 to the provider 102. Upon receiving each respective set of information (i.e., a set from the device 128 and another set from the device 204), the provider may attempt to match each set of information received from the sensors to other sets of information received from other devices for the purpose of determining a likelihood that two (or more) devices experienced a common event. For instance, the provider 102 may include logic to calculate a similarity between respective sets of information received from environmental sensors and may compare this to a predefined similarity threshold. The compared information may be associated with, among other things, location, vibration, orientation, an image, barometric pressure, temperature and the like. Upon identifying sets of information having a similarity that is greater than the threshold, the provider 102 may determine that the associated devices are likely to have encountered the same event and, therefore, that these devices may desire to conduct a transaction for a multipart payment card.

For example, the provider 102 may determine that the distributor 106 and the user 108(1) have associated their respective devices together with one another and, in response, may initiate a transaction between these devices. In some instances, the payment-card application 202 may receive an instruction from the provider 102 to surface/display a user interface asking if the users of the devices intend to exchange a card for payment. If the distributor 106 and the user 108(1) consent, then the payment-card applications 202 may exchange, for example, the bottom portion 112 of a predetermined card for an equal amount of payment at 606. For instance, the device 128 may transfer the bottom portion 112 of the card to the device 204 in exchange for payment going from an account associated with the user 108(1) to an account associated with the distributor 106. Further, the applications may surface a confirmation message, as described above with reference to FIG. 5.

While the above example describes transferring a predetermined payment card, in other instances the surfaced user interface may allow one or both of the distributor 106 and the user 108(1) to specify an amount of funds to associate with the payment card.

Furthermore, while the illustration of FIG. 6 describes transferring the bottom portion of the card in response to the device 128 and the device 204 bumping into one another, such a transfer may occur in response to any other type of event determinable from the information acquired by the environmental sensors 608. For instance, shaking, spinning or otherwise exposing the devices to a particular identifiable event when within a predefined proximity of one another may trigger the process 600 or a similar process.

Figure 7:
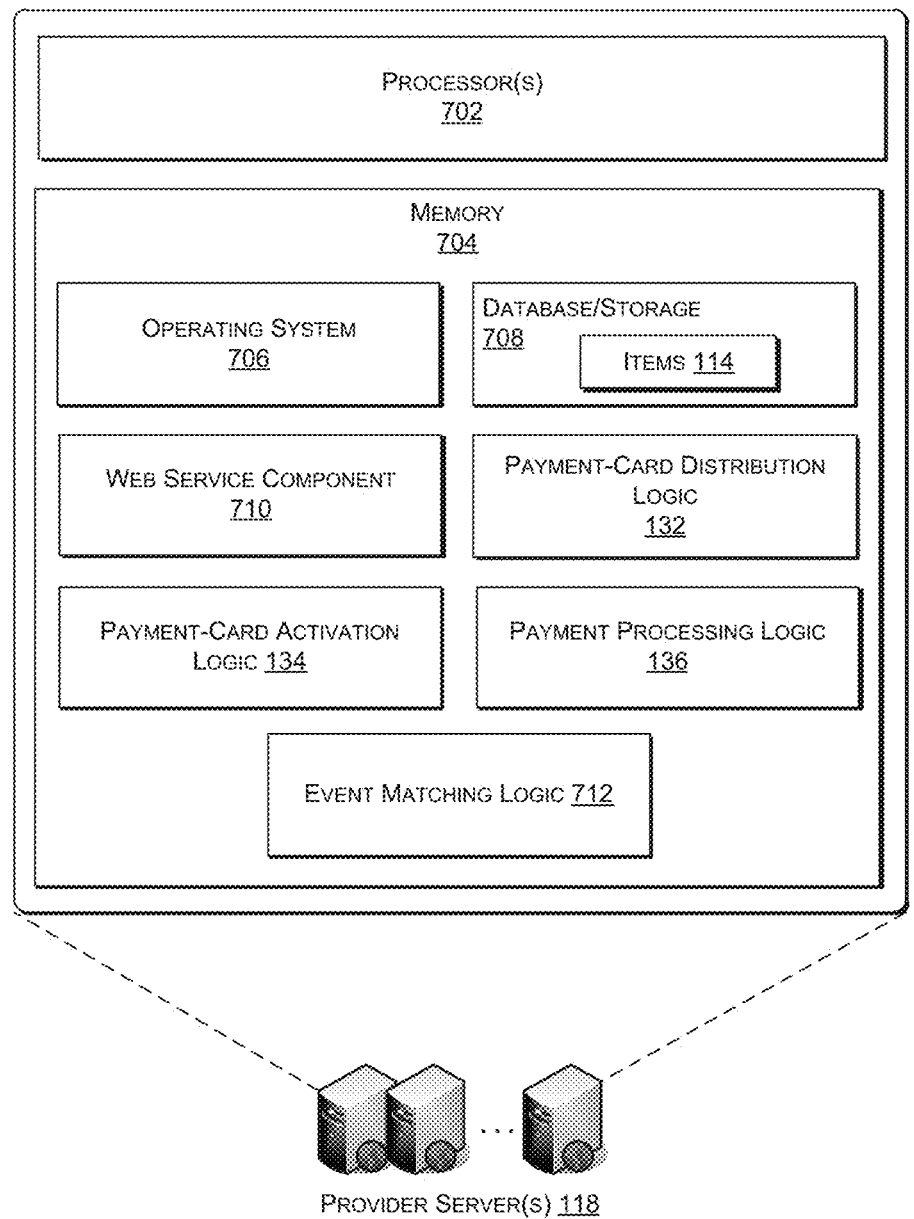
FIG. 7 depicts possible components of the servers of the provider of FIGS. 1A-1B.

FIG. 7 depicts possible components of the server(s) 118 of the provider 102 of FIGS. 1-2. As illustrated, the servers 118 may include one or more processors 702 and memory 704. The memory 704 (as well as the memory on other computing devices described herein) may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

In this example, the memory 704 stores or otherwise has access to, in part, an operating system 706 and a database or storage 708 to store at least the items 114 referenced above. Functional components of the servers 118 may also comprise a web service component 710 that interacts with remote devices, such as the devices 128 and 204 described above. The web service component 710 may, in part, allow users to navigate and request acquisition of the items 114 offered by the provider 102. The memory 704 may also store or have access to the payment-card distribution logic 132, the payment-card activation logic 134 and the payment processing logic 136, as discussed above.

Finally, the servers 118 may include event matching logic 712, which may function to analyze information received from a device's environmental sensors 608 to determine when devices experience a same or similar event, as described above with reference to FIG. 6. Furthermore, while FIG. 7 illustrates a few example components, the servers 118 may of course include many other logical, programmatic and physical components.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of a mobile device associated with a distributor configured with executable instructions,
downloading, from a provider, a payment-card application;
registering, via the payment-card application, a first identifier of the distributor with the provider;
downloading, via the payment-card application, an inactive digital multipart payment card, the inactive digital multipart payment card being one of a plurality of inactive digital multipart payment cards;
displaying, via the payment-card application, a user interface including:
a first part of the inactive digital multipart payment card comprising a second identifier that uniquely identifies the digital multipart payment card, and
a second part of the inactive digital multipart payment card comprising a redemption value available for use in purchasing one or more items;

sending, via the payment-card application, a request to the provider to activate the inactive digital multipart payment card, the request including the first identifier and the second identifier, wherein the provider:
  determines, based at least in part on information from one or more environmental sensors of the mobile device of the distributor, that the mobile device of the distributor and an electronic device of a purchaser of the digital multipart payment card experienced a common event;
  verifies that the digital multipart payment card is associated with the mobile device using the first identifier, and
  causes the digital multipart payment card to be activated; and
modifying, via the payment-card application, the user interface to remove the second part of the inactive digital multipart payment card.

2. The method as recited in claim 1, wherein the request further includes the redemption value associated with the digital multipart payment card.

3. The method as recited in claim 2, further comprising designating the redemption value based at least partly on input received from a recipient of the second part of the digital multipart payment card during activation of the digital multipart payment card.

4. The method as recited in claim 1, further comprising:
altering an amount of an account associated with the distributor for the redemption value.

5. The method as recited in claim 1, further comprising:
altering an amount of an account associated with the distributor for at least a portion of the redemption value.

6. The method as recited in claim 1, further comprising:
sending, via the payment-card application, a request to activate an additional digital multipart payment card of the plurality of inactive digital multipart payment cards; and
receiving, from the provider, a response denying activation of the additional digital multipart payment card, wherein denying activation of the additional digital multipart payment card is based at least partly on determining that an account associated with the distributor has insufficient funds.

7. The method as recited in claim 1, further comprising:
receiving, via the payment-card application and as part of activating the digital multipart payment card, an award.

8. The method as recited in claim 7, wherein the award includes at least one of the following: coupons, virtual credits, loyalty points, virtual currency for redemption in an online game, virtual currency for redemption in a virtual world, or virtual currency for redemption in a social network.

9. The method as recited in claim 1, further comprising:
receiving, by the provider, additional information of one or more additional environmental sensors of the electronic device associated with the purchaser of the digital multipart payment card, and
identifying, by the provider, an account of the purchaser of the digital multipart payment card based at least in part on the additional information of the one or more additional environmental sensors.

10. The method as recited in claim 9, further comprising:
comparing the additional information of the one or more additional environmental sensors of the electronic device associated with the purchaser to the information of the one or more environmental sensors of the mobile device of the distributor; and
determining that the additional information of the one or more additional environmental sensors of the electronic device of the purchaser and the information of the one or more environmental sensors of the mobile device associated with-the distributor exceeds a similarity threshold.

11. The method as recited in claim 1, wherein the second identifier comprises a bar code, a quick response (QR) code, an alphanumeric code, a numeric code, or an activation code for activating the digital multipart payment card.

12. The method as recited in claim 1, wherein the plurality of inactive digital multipart payment cards are associated with one or more merchants, and wherein the second part of the digital multipart payment card includes at least one of a bar code, a QR code, or a redemption code for purchasing the one or more items from the one or more merchants.

13. The method as recited in claim 1, wherein the plurality of inactive digital multipart payment cards are made available to the mobile device of the distributor.

14. The method as recited in claim 1, wherein the request to activate the digital multipart payment card identifies the purchaser of the digital multipart payment card, and the method further comprises sending, to the electronic device of the purchaser, a confirmation that the digital multipart payment card has been activated.

15. A method comprising:
identifying an account of a distributor with a provider, wherein the account includes a first identifier of a mobile device of the distributor;
sending a plurality of inactive digital payment instruments to the mobile device of the distributor;
receiving information from an environmental sensor of the mobile device of the distributor;
determining, based at least in part on the information from the environmental sensor, that the mobile device of the distributor is associated with an electronic device of a purchaser of the digital payment instrument;
receiving, from the mobile device of the distributor, an activation request for a digital payment instrument of the plurality of inactive digital payment instruments, wherein the activation request comprises:
  activation information including the first identifier,
  a second identifier of the purchaser of the digital payment instrument, and
  redemption information that is associated with the digital payment instrument and comprises a value of the digital payment instrument that is available for use in purchasing one or more items;
verifying that the digital payment instrument is associated with the distributor based, at least in part, on the activation information;
determining that a balance of the account of the distributor is at least the value of the digital payment instrument;
causing the digital payment instrument to be activated; and
sending, to the electronic device of the purchaser, a confirmation that the digital payment instrument has been activated.

16. The method as recited in claim 15, further comprising:
causing an amount of the account of the distributor to be altered for the value associated with the digital payment instrument.

17. The method as recited in claim 15, wherein sending to the distributor a plurality of inactive digital payment instruments comprises:
providing, to the mobile device of the distributor, access to the plurality of inactive digital payment instruments.

18. The method as recited in claim 15, further comprising:
causing the account of the distributor to be debited for at least a portion of the value associated with the digital payment instrument.

19. The method as recited in claim 15, further comprising:
receiving, from the mobile device of the distributor, an additional activation request identifying an additional digital payment instrument including identification of an additional purchaser;
determining that insufficient funds exist in the account of the distributor;
causing denial of activation of the additional digital payment instrument; and
causing a message to be sent to an additional electronic device of the additional purchaser that indicates the additional digital payment instrument has not been activated.

20. The method as recited in claim 15, further comprising:
causing a non-monetary award to be provided to the distributor in response to activating the digital payment instrument.

21. The method as recited in claim 20, wherein the non-monetary award to be provided to the distributor includes at least one of the following: virtual credits, loyalty points, virtual currency for redemption in an online game, virtual currency for redemption in a virtual world, or virtual currency for redemption in a social network.

22. The method as recited in claim 15, wherein determining that the mobile device of the distributor is associated with the electronic device of the purchaser of the digital payment instrument includes determining a likelihood that the mobile device of the distributor and the electronic device of the purchaser experienced a common event.

23. The method as recited in claim 15, further comprising:
comparing the information of the one or more environmental sensors of the mobile device of the distributor to additional information of one or more environmental sensors of the electronic device of the purchaser;
determining that the information of the one or more environmental sensors of the mobile device associated with the distributor and the additional information of the one or more environmental sensors of the electronic device of the purchaser exceeds a similarity threshold; and
associating the electronic device of the purchaser with an account of the purchaser.

24. The method as recited in claim 22, wherein the one or more environmental sensors include at least one of the following: an infrared sensor, a global positioning system (GPS) sensor, a gyroscope, a vibration sensor, a barometer, a camera, an altitude sensor, or a thermometer.

25. The method as recited in claim 15, further comprising:
receiving, from the electronic device of the purchaser, a request to obtain an item with use of at least a portion of the value of the digital payment instrument; and
altering the at least a portion of the value of the digital payment instrument from an account associated with the digital payment instrument.

26. The method as recited in claim 25, wherein the redemption information of the digital payment instrument includes an additional identifier that links the redemption information to the value of the digital payment instrument, and wherein the request to obtain the item includes the additional identifier.

27. The method as recited in claim 15, further comprising:
causing an award to be provided to the distributor in response to activating the digital payment instrument.

28. The method as recited in claim 27, wherein the award includes at least one of the following: virtual currency, virtual credits, or loyalty points.

29. The method of claim 15, wherein the value associated with the digital payment instrument is designated by a recipient of the redemption information.

30. A computer-implemented method, comprising:
providing, via at least one of one or more computing devices of a distributor, payment to a provider for a digital payment instrument, wherein the payment has a value and the at least one of the one or more computing devices of the distributor include at least one environmental sensor;
electronically receiving, via the at least one of the one or more computing devices of the distributor, the digital payment instrument from the provider, the digital payment instrument received in an inactive state and comprising:
activation information for activating the digital payment instrument; and
redemption information that is associated with the value of the digital payment instrument, the value being available for use in purchasing one or more items;
obtaining data from one or more environmental sensors of the at least one of the one or more computing devices of the distributor;
sending the data from the one or more environmental sensors to a computing device of a provider;
displaying a user interface including:
a first part of the digital payment instrument comprising an identifier that uniquely identifies the digital payment instrument; and
a second part of the digital payment instrument indicating the value of the digital payment instrument;
sending, via the at least one of the one or more computing devices of the distributor, the activation information to the computing device of the provider for activating the redemption information of the digital payment instrument;
electronically distributing, via the at least one of the one or more computing devices of the distributor, the redemption information to an electronic device of the purchaser; and
modifying the user interface to remove the second part of the digital payment instrument.

31. The method as recited in claim 30, further comprising:
designating the value of the digital payment instrument; and
sending the value of the digital payment instrument to the provider along with the activation information.

32. The method as recited in claim 30, wherein the redemption information is at least one of the following: a quick response (QR) code, an alphanumeric code, a numeric code, a bar code, or a redemption code.

33. The method as recited in claim 30, wherein the at least one of the one or more computing devices of the distributor include a mobile device and electronically distributing the redemption information to the electronic device of the purchaser comprises at least one of:

electronically connecting the mobile device of the distributor with the electronic device of the purchaser; or shaking the mobile device of the distributor within a predefined proximity of the electronic device of the purchaser.

34. The method as recited in claim 30, further comprising:

receiving, by the at least one of the one or more computing devices of the distributor, a confirmation that the digital payment instrument has been activated by the provider.

35. The method as recited in claim 30, further comprising:

sending a message confirming activation of the redemption information to the electronic device of the purchaser.

36. A system comprising:

one or more processors;

one or more databases storing information about a distributor comprising a distributor identifier and an account of the distributor; and one or more non-transitory computer-readable media storing computer-executable instructions that, when executed by the one or more processors, perform operations comprising:

electronically distributing, to a mobile device of the distributor, a plurality of digital payment instruments that have value available for use in purchasing one or more items;

receiving, from the mobile device of the distributor, a request to activate a digital payment instrument of the plurality of digital payment instruments, the request including the distributor identifier;

receiving information from an environmental sensor of the mobile device of the distributor;

determining, based at least in part on the information from the environmental sensor, that the mobile device of the distributor is associated with an electronic device of a purchaser of the digital payment instrument;

verifying that the digital payment instrument is associated with the distributor based, at least in part, on the distributor identifier;

determining that the account associated with the distributor has a sufficient balance; and causing the digital payment instrument to be activated.

37. The system as recited in claim 36, wherein a value associated with the digital payment instrument is a predetermined value.

38. The system as recited in claim 36, wherein a value associated with the digital payment instrument is designated by the purchaser of the digital payment instrument.

39. The system as recited in claim 38, wherein the request further includes the value designated by the purchaser of the digital payment instrument.

40. The system as recited in claim 36, wherein the operations further comprise causing the balance of the account associated with the distributor to be altered for a value associated with the digital payment instrument.

41. The system as recited in claim 36, wherein the digital payment instrument is associated with redemption information, and the operations further comprise:

causing a message to be provided to the purchaser, the message indicating that the digital payment instrument has been activated.

42. The system as recited in claim 36, wherein the operations further comprise:

receiving, from the mobile device of the distributor, additional activation information identifying an additional digital payment instrument, wherein the additional digital payment instrument is associated with additional redemption information;

determining that insufficient funds exist in the account associated with the distributor;

causing denial of activation of the additional digital payment instrument; and causing a message to be provided to a computing device of an additional purchaser of the additional payment instrument, the message indicating that activation of the additional payment instrument has been denied.

43. The system as recited in claim 36, wherein the operations further comprise:

causing an award to be provided to the distributor in response to activating the digital payment instrument.

* * * * *